United States Patent
Hansen

(10) Patent No.: US 9,321,410 B2
(45) Date of Patent: Apr. 26, 2016

(54) PIVOTING MECHANISM FOR MOVABLY ATTACHING A CAMERA TO A VEHICLE

(75) Inventor: Ralf Hansen, Braunschweig (DE)

(73) Assignee: VOLKSWAGEN AG, Wolfsburg (DE)

( * ) Notice: Subject to any disclaimer, the term of this patent is extended or adjusted under 35 U.S.C. 154(b) by 163 days.

(21) Appl. No.: 14/240,807

(22) PCT Filed: Jul. 19, 2012

(86) PCT No.: PCT/EP2012/003046
§ 371 (c)(1),
(2), (4) Date: Feb. 25, 2014

(87) PCT Pub. No.: WO2013/029718
PCT Pub. Date: Mar. 7, 2013

(65) Prior Publication Data
US 2014/0197649 A1 Jul. 17, 2014

(30) Foreign Application Priority Data
Aug. 27, 2011 (DE) .......................... 10 2011 111 854

(51) Int. Cl.
*G03B 17/00* (2006.01)
*B60R 11/04* (2006.01)
(Continued)

(52) U.S. Cl.
CPC . *B60R 11/04* (2013.01); *E05C 3/16* (2013.01); *B60R 2011/004* (2013.01); *B60R 2011/0082* (2013.01); *B60R 2011/0092* (2013.01); *Y10T 292/57* (2015.04)

(58) Field of Classification Search
CPC ..................................................... B60R 11/04
USPC ........................................................ 396/427
See application file for complete search history.

(56) References Cited

U.S. PATENT DOCUMENTS

2004/0130622 A1* 7/2004 Lang ....................... B60R 11/04
348/148
2009/0231430 A1* 9/2009 Buschmann ......... B60Q 1/0023
348/148
(Continued)

FOREIGN PATENT DOCUMENTS

CN 101824944 A 9/2010
DE 102006023103 A1 11/2007
(Continued)

OTHER PUBLICATIONS

Search Report for Chinese Patent Application No. 201280041902.9; May 14, 2015.
(Continued)

*Primary Examiner* — Clayton E Laballe
*Assistant Examiner* — Dennis Hancock
(74) *Attorney, Agent, or Firm* — Barnes & Thornburg LLP

(57) ABSTRACT

A pivoting mechanism for movably attaching a camera to a vehicle. The pivoting mechanism has a vehicle-mounted component; a first rotational joint attached to the vehicle-mounted component; a first pivot arm, the first end of which is rotatably mounted on the first rotational joint; a second rotational joint attached to the vehicle-mounted component; a second pivot arm, the first end of which is rotatably mounted on the second rotational joint; a camera holder; a third rotational joint attached to the camera holder and on which a second end of the first pivot arm is rotatably mounted; and a fourth rotational joint attached to the camera holder and on which a second end of the second pivot arm is rotatably mounted.

10 Claims, 6 Drawing Sheets

(51) Int. Cl.
  *E05C 3/16* (2006.01)
  *B60R 11/00* (2006.01)

(56) References Cited

U.S. PATENT DOCUMENTS

| | | | | |
|---|---|---|---|---|
| 2009/0309971 A1* | 12/2009 | Schuetz | ............... | B60R 11/04 348/148 |
| 2010/0040361 A1* | 2/2010 | Schuetz | ............... | B60R 11/04 396/428 |

FOREIGN PATENT DOCUMENTS

| | | | |
|---|---|---|---|
| DE | 102006039192 A1 | 2/2008 | |
| DE | 102006048373 A1 | 4/2008 | |
| DE | 102008010966 A1 | 8/2009 | |
| DE | 102009008281 A1 | 8/2010 | |
| DE | 102010001196 A1 | 7/2011 | |
| EP | 2054572 A1 | 5/2009 | |
| WO | 2011086132 A1 | 7/2011 | |

OTHER PUBLICATIONS

Search Report for German Patent Application No. 10 2011 111 854.7; May 2, 2012.
Search Report for International Patent Application No. PCT/EP2012/003046; Oct. 12, 2012.

\* cited by examiner

PIVOTING MECHANISM FOR MOVABLY ATTACHING A CAMERA TO A VEHICLE

PRIORITY CLAIM

This patent application is a U.S. National Phase of International Patent Application No. PCT/EP2012/003046, filed 19 Jul. 2012, which claims priority to German Patent Application No. 10 2011 111 854.7, filed 27 Aug. 2011, the disclosures of which are incorporated herein by reference in their entirety.

SUMMARY

The present disclosure relates to a pivoting mechanism for the movable attachment of a camera to a vehicle, in particular for the attachment of a so-called reversing camera which is designed for imaging an external area behind the vehicle.

BRIEF DESCRIPTION OF THE DRAWINGS

Illustrative embodiments are described in detail below with reference to the drawings.

DETAILED DESCRIPTION OF THE DISCLOSED EMBODIMENTS

Figure 1:
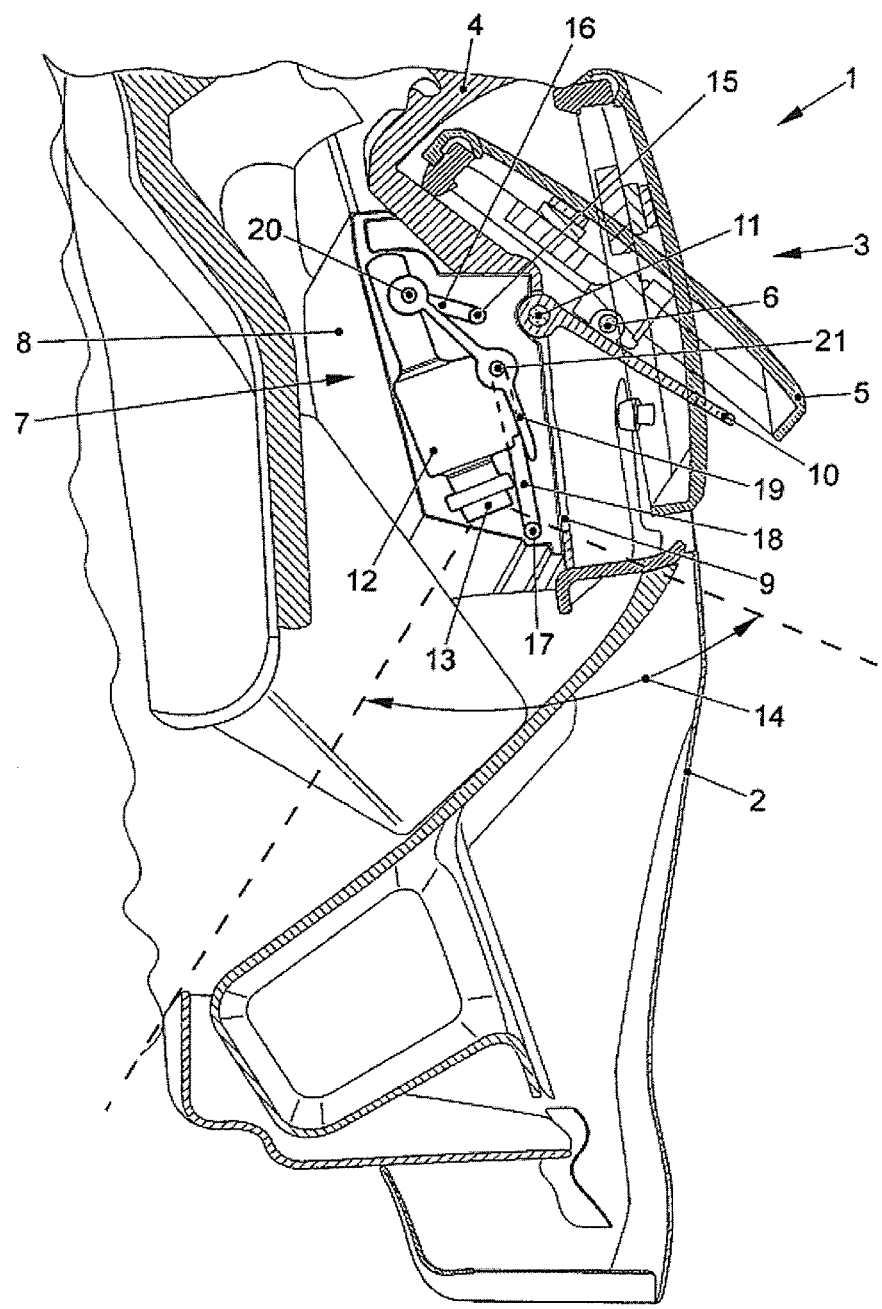
FIG. 1 shows an operating device according to at least one disclosed embodiment in a tailgate of a vehicle.

FIG. 1 shows a detail of a tailgate 1 of a vehicle with an exterior side 2. The exterior side 2 forms a part of the body of the vehicle. In the tailgate 1 there is provided an opening in which an operating device 3 for opening a vehicle lock (not shown in FIG. 1) of the tailgate 1. The operating device 3 comprises a housing 4 which is inserted into the opening of the tailgate 1. A handle 5 is mounted in the housing 4 so as to be pivotable about a pivot axis 6. In an unactuated state of the handle 5, the handle 5 terminates substantially/with the exterior skin 2 of the tailgate 1. FIG. 1 shows an actuated state of the operating handle 5 in which an upper part of the operating handle has been tilted into the housing 4 of the operating device and a lower part of the operating handle 5 projects from the housing 4 and the exterior skin 2 of the tailgate 1. The operating device 3 also comprises a camera module 7 with a camera module housing 8. The camera module housing 8 has an opening 9 that can be closed off by a flap 10 which is mounted so as to be rotatable about an axis 11. FIG. 1 shows the flap 10 in an open state, such that, in FIG. 1, there is a connection from the interior of the module housing 8 to the outside of the vehicle through the opening 10 and the outwardly projecting operating handle 5. A camera 12 with an objective 13 is situated in the camera module housing 8. The objective 13 has an image capture area schematically illustrated by the dashed lines and the angle arc 14 in FIG. 1.

Figure 2:
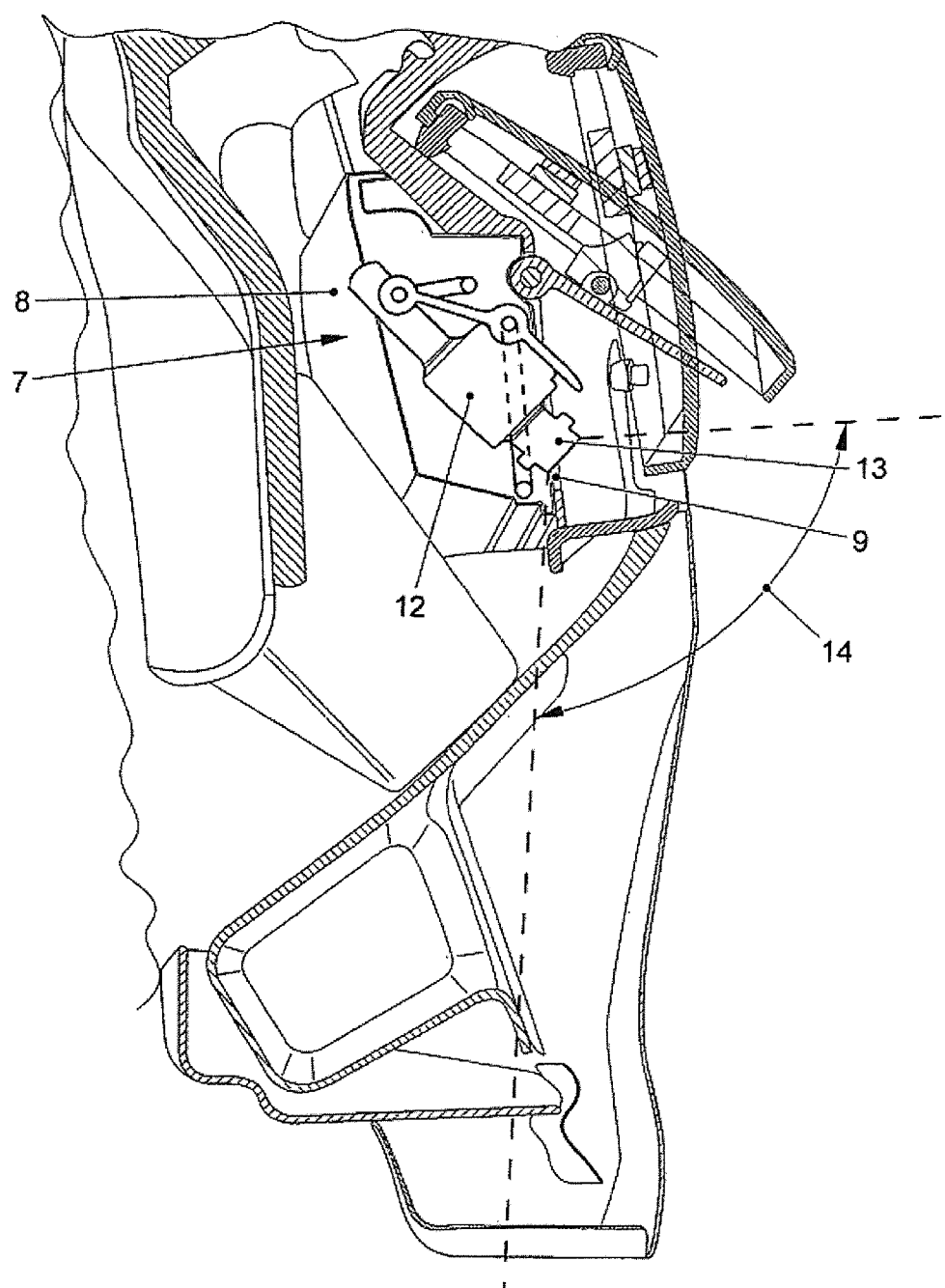
FIGS. 2-5 show snapshots during the course of a movement of a pivoting mechanism and of a camera of the operating device of FIG. 1.
Figure 3:
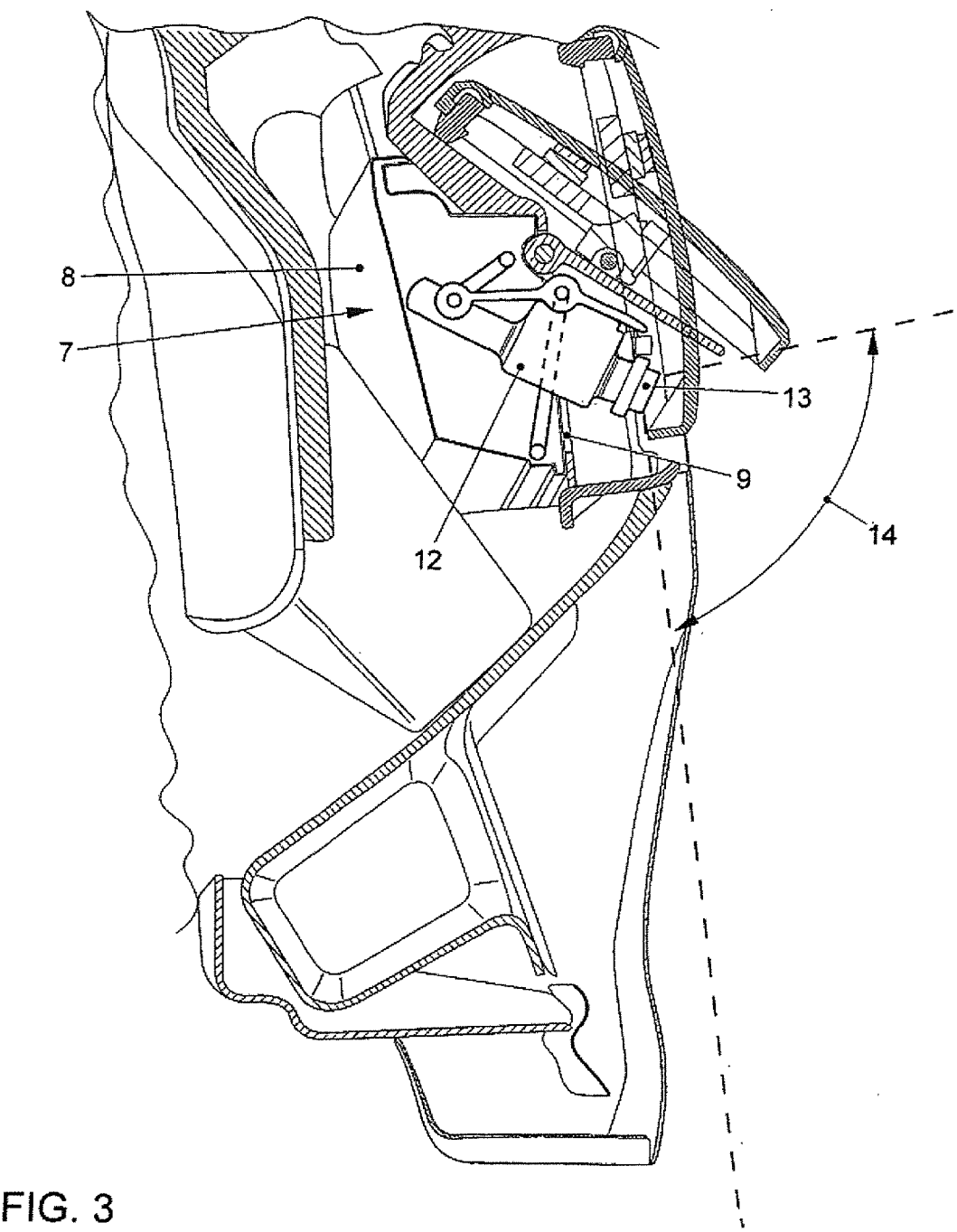
Figure 4:
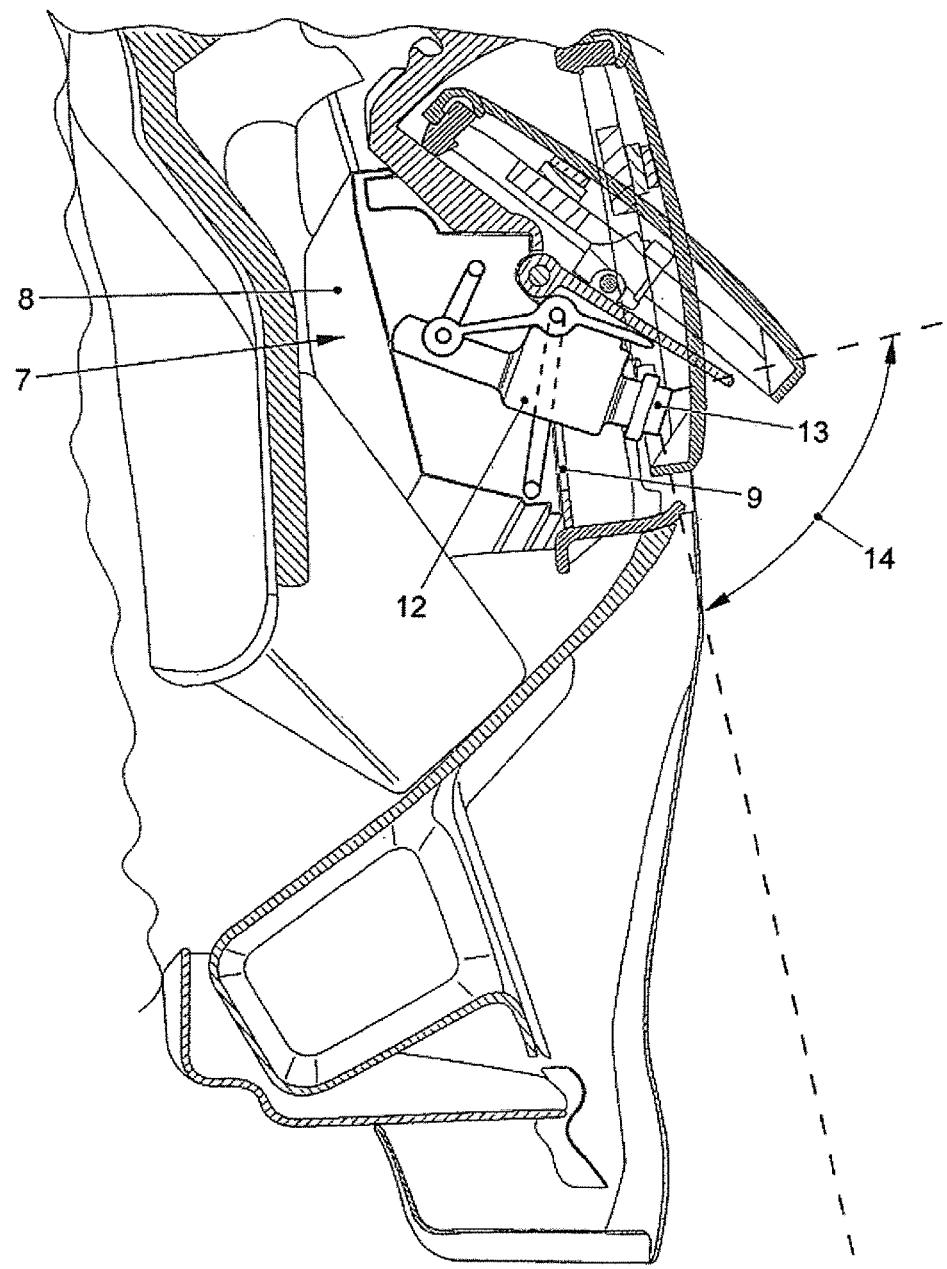
Figure 5:
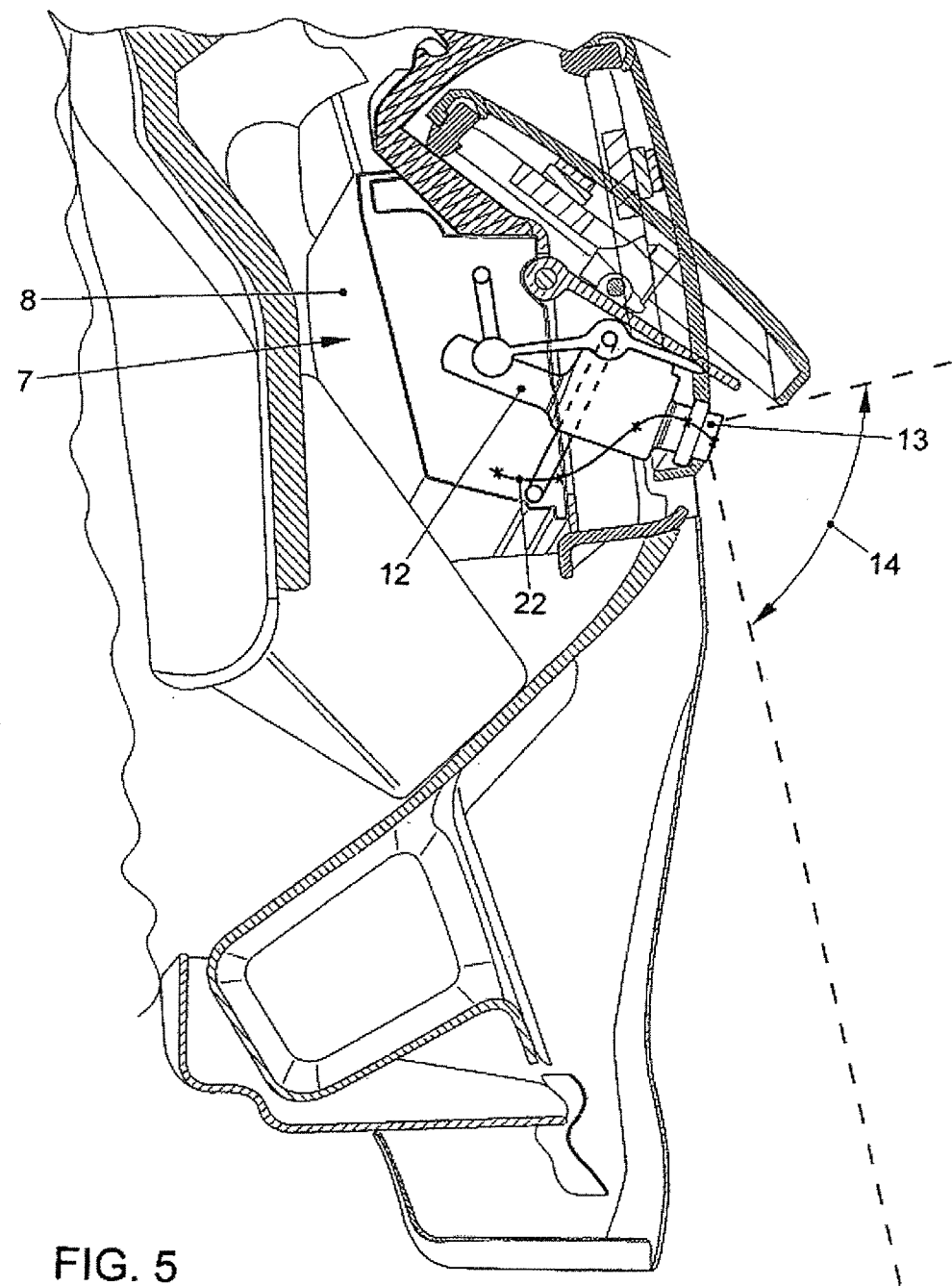

The camera 12 is movably attached to the camera module housing 8 by means of a four-joint hinge. The four joint hinge comprises a first rotary joint 15, which is attached to the camera module housing 8, a first pivot arm 16, which is rotatably mounted by way of a first end on the first rotary joint 15, a second rotary joint 17, which is attached to the camera module housing 8 at a first distance from the first rotary joint 15, a second pivot arm 18, which is rotatably mounted by way of a first end on the second rotary joint 17, a camera holder 19, to which the camera 12 is attached, a third rotary joint 20, which is attached to the camera holder 19 and on which a second end of the first pivot arm 16 is rotatably mounted, and a fourth rotary joint 21, which is attached to the camera holder 19 at a second distance from the third rotary joint 20 and on which a second end of the second pivot arm 18 is rotatably mounted. The second pivot arm 18 is partially concealed by the camera 12 and the camera holder 19 in FIG. 1, and is therefore shown partially by dashed lines in FIG. 1. The first pivot arm 16 has a first length that differs from the length of the second pivot arm 18. Likewise, the distance between the first rotary joint 15 and the second rotary joint 17 differs from the distance between the third rotary joint 20 and the fourth rotary joint 21. The lengths of the pivot arms 16 and 18 and the distances between the rotary joints are selected such that the camera 12 can be moved between a first position and a second position. In the first position, the camera 12 is situated in the position shown in FIG. 1, and in the second position, the camera 12 is in the position shown in FIG. 5. Snapshots of a movement of the camera 12 between the position shown in FIG. 1 and the position shown in FIG. 5 are shown in FIGS. 2, 3 and 4. The same reference numerals are used to denote identical components in FIGS. 1-5.

The movement of the camera 12 from the first position into the second position will be described in detail below. In FIG. 1, the camera 12 is accommodated entirely, and in a space-saving manner (that is to say approximately vertically within the tailgate), in the camera module housing 7. FIG. 2 shows a state in which the objective 13 of the camera 12 is already projecting partially through the opening 9 of the camera module housing 7. FIG. 3 shows a subsequent state in which the objective 13 is already arranged entirely outside the camera module 7 and a part of the camera 12 is projecting through the opening 9 of the camera module housing 7. During its movement from FIG. 1 to FIG. 3, the camera 12 has, overall, been rotated so as to have been moved longitudinally through the opening 9. FIG. 4 shows a state in which the camera 12 has moved yet further in the direction of the exterior skin 2 of the tailgate 1 and thus the objective 13 already has a clear view of an area behind the tailgate 1 or behind the vehicle. To obtain a better view in particular of the area directly behind a bumper of the vehicle or even of the bumper of the vehicle from above, the camera 12 is moved further outward, as shown in FIG. 5, such that the objective 13 projects outward through the opening in the exterior skin 2 of the tailgate 1, and additionally, the camera 12 is rotated such that the field of view 14 is expanded in the direction of the bumper of the vehicle, that is to say the longitudinal axis of the camera is inclined more steeply. FIG. 5 shows the entire movement profile of the objective 13 in a movement path 22. The crosses marked along the movement past 22 show the snapshots of FIGS. 1-5, that is to say the cross at the far left designates the position of the objective 13 in FIG. 1, the next cross designates the position of the objective 13 in FIG. 2, etc., until finally, the cross at the far right on the movement path 22 designates the position of the objective 13 in FIG. 5. As can be seen from FIG. 5, the movement path 22 has an S-shaped profile. In this way, the camera 12 can be moved from its initial position shown in FIG. 1 into its operating position shown in FIG. 5 in a space-saving manner. The movement of the four-joint hinge may be effected for example by means of an electric motor as a drive unit in conjunction with a gearing. The drive unit may for example generate a rotational movement at the first rotary joint 15 or at the second rotary joint 17. The movement into the imaging position shown in FIG. 5 is thus achieved by virtue of the camera being moved into an adequately outwardly projecting position by means of two rotational movements with a point of inflection. By comparison with only one rotational movement, the two rotational movements make it possible for there to be no restriction of the field of view both in the upper region and also in the lower region, that is to say there is in particular a clear view of the bumper.

The protective flap 10 can be moved by means of the rotary joint 11 such that no noises are generated as a result of contact and friction between the protective flap 10 and the camera 12. Furthermore, the flap 10 provides protection against dust, water spray and manipulation of the camera. The rotary joint 11 of the protective flap 10 may for example be actuated, via a coupling mechanism, by means of the same drive unit as that which drives the four-joint hinge.

Figure 6:
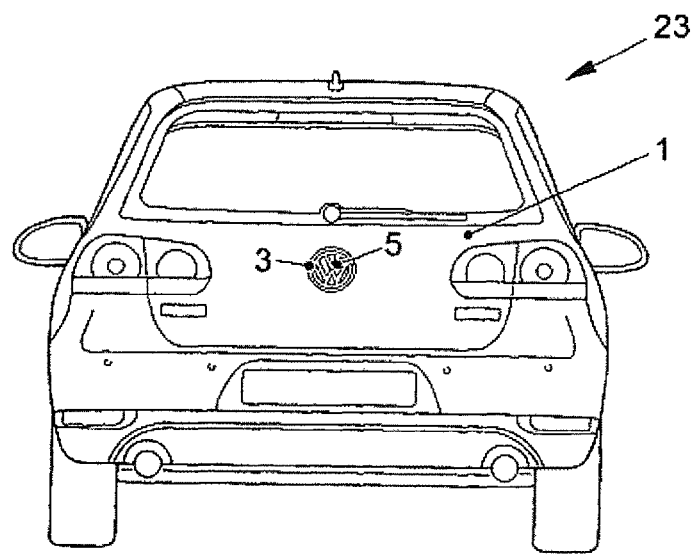
FIG. 6 shows a vehicle according to a least one disclosed embodiment from the rear.

FIG. 6 shows a vehicle 23 with a tailgate 1 in which the operating device 3 shown in FIGS. 1-5 is arranged in an opening of the tailgate 1. In the disclosed embodiment shown in FIG. 6, the operating handle 5 is a vehicle emblem.

Figure 7:
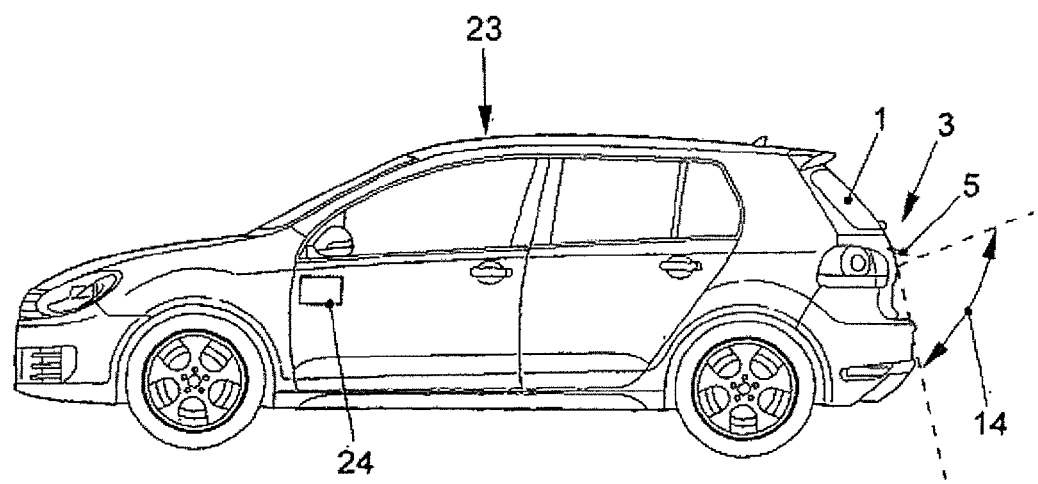
FIG. 7 shows a vehicle according to at least one disclosed embodiment from the side.

FIG. 7 shows a vehicle 23 in a side view. The operating handle 5 of the operating device 3 is situated in the actuated position, such that, below the operating handle 5, the camera 12 can be deployed, as shown in FIGS. 1-5, to image the image capture region 14. The image recorded by the camera 12 may for example be displayed on a display unit 24 of the vehicle 23, such that a driver of the vehicle 23 is provided with visual information regarding the area 14 behind the vehicle during reverse travel, for example during parking or maneuvering.

Even though the pivoting mechanism for the movable attachment of the camera 12 to the tailgate or to the luggage compartment cover 1 has been described as a four-joint hinge in the description above, the present invention is not restricted to this, but also comprises pivoting mechanism is with multi joint hinges having more than four joints. Furthermore, the present invention is not restricted to the pivoting mechanism being mounted in a tailgate or a luggage compartment cover of the vehicle. Other possible mounting locations are for example in a front region of the vehicle, for example in a radiator grille or a radiator grille emblem, or in side regions of the vehicle, for example in a door handle or in a wing mirror of the vehicle.

Illustrative embodiments provide a mounting for a camera, in particular a reversing camera. This is achieved by means of a pivoting mechanism, a camera module, an operating device, and a vehicle.

Illustrative embodiments provide a pivoting mechanism for the movable attachment of a camera to a vehicle. The pivoting mechanism comprises a vehicle-side component, a camera holder, a first pivot arm, a second pivot arm, a first rotary joint, a second rotary joint, a third rotary joint and a fourth rotary joint. The vehicle-side component can be attached to the vehicle. The first rotary joint is attached to the vehicle-side component and the second rotary joint is attached to the vehicle-side component at a first distance from the first rotary joint. The third rotary joint is attached to the camera holder and the fourth rotary joint is attached to the camera holder at a second distance from the third rotary joint. The first pivot arm comprises a first end, a second end and a first length. The first end is rotatably mounted on the first rotary joint and the second end is rotatably mounted on the third rotary joint. The second pivot arm comprises a first end, a second end and a second length. The first end is rotatably mounted on the second rotary joint and the second end is rotatably mounted on the fourth rotary joint. The pivot mechanism thus forms a four-joint mount or four-joint hinge, whereby the camera holder can be moved, together with a camera mounted thereon, for example from a first, retracted position into a second, deployed position. Since only rotational movements at the rotary joints are required for the movement of the camera holder and there is no need for translational movements for example on guide rails or in guide grooves, an actuation of the pivoting mechanism is possible with relatively little expenditure of force. In this way, a small and inexpensive drive can be used for moving the camera.

In at least one disclosed embodiment, the first distance between the first and second rotary joints and the second distance between the third and fourth rotary joints are different. Alternatively or in addition, the first length of the first pivot arm and the second length of the second pivot arm may be different. By means of such an asymmetrical design of the pivoting mechanism, a movement path of the camera holder and of the camera mounted thereon can be configured as required, and it is for example possible for a movement path to be realized in which the camera is moved at least partially through an opening in a body of the vehicle and is additionally pivoted to be suitably oriented toward the desired area to be imaged.

In a further disclosed embodiment, the first distance, the second distance, the first length and the second length are dimensioned such that the camera holder is movable between a first position and a second position in relation to the vehicle-side component. Furthermore, the first and second distances and the first and second lengths are dimensioned such that at least one region of the camera holder moves along an S-shaped movement path during a movement of the camera holder between the first position and a second position in relation to the vehicle-side component. By means of the S-shaped movement path, it is for example possible to realize a situation in which the camera mounted on the camera holder is held within the vehicle in a space-saving orientation when in the first position, so as to then be pivoted at least partially outward through an opening in the body of the vehicle along the S-shaped movement path and finally oriented such that the camera is capable of capturing the desired area to be imaged. In other words, the pivoting mechanism performs two rotational movements, wherein a change in direction takes place from the first rotational movement to the second rotational movement.

In a further disclosed embodiment, the pivoting mechanism comprises a drive unit, for example an electric motor with a gearing, which drive unit is designed to move the camera holder between the first and the second position. The drive unit may for example act on one of the four rotary joints and actuate the pivoting mechanism by means of a rotational movement. Since the pivoting mechanism operates without translational movements, a simple gearing can be used which provides merely a transmission of torque. By contrast, a conversion of a rotational movement of the electric motor into a translational movement is not necessary, such that the drive unit can be of inexpensive, compact and lightweight form.

Illustrative embodiments provide a camera module for a vehicle. The camera module comprises the above-described pivoting mechanism and a camera which is attached to the camera holder of the pivoting mechanism. By means of the above-described four-joint hinge, the camera can be accommodated in a space-saving manner in the camera module and additionally moved in a space-saving manner into the second position so as to be oriented toward a predetermined area to be imaged.

In at least one disclosed embodiment, the vehicle-side component comprises a housing, for example a camera module housing, with an opening. The first distance, the second distance, the first length and the second length of the pivoting mechanism are dimensioned such that the camera is movable between a first position and a second position in relation to the housing. In the first position, the camera is arranged in the interior of the housing, and in the second position, the camera projects at least partially outward through the opening of the housing. Furthermore, the above-described drive unit may be accommodated in the housing of the camera module. By virtue of the pivoting mechanism, the camera and, if appropriate, the drive unit being accommodated in the housing of the camera module, and the housing simultaneously comprising the vehicle-side component on which the first and second rotary joints are mounted, it is possible for a compact camera module to be provided which can be mounted, as an easily exchangeable module unit, on an inner side of the body at a suitable opening in the body.

Illustrative embodiments provide an operating device for opening a vehicle lock. The operating device comprises an operating handle and the above-described camera module. The operating handle can be mounted in an opening of an exterior skin of a vehicle body and can be moved from a rest position into an actuated position to open the vehicle lock. The operating handle, in the rest position, substantially closes the opening in the exterior skin, and in the actuated position, projects at least partially from the exterior skin. The operating handle may for example be of flap-like form and be tilted at least partially outward from the exterior skin during an actuation. The camera module can be mounted in an interior region of the vehicle within the exterior skin such that the opening of the housing of the camera module and the opening of the exterior skin are situated opposite one another such that the camera, in the second position, projects at least partially outward through the opening of the housing and through the opening in the exterior skin. By contrast, in the first position, the camera is accommodated entirely within the housing of the camera module, such that the operating handle can lie flat on or in the exterior skin and thus closes off the opening in the vehicle body. The camera is thereby simultaneously protected from the outside.

In at least one disclosed embodiment, the operating handle is moved from the rest position into the actuated position together with the movement of the camera from the first position into the second position. In this way, the opening in the external skin of the vehicle body is automatically opened up, such that the camera can be guided through the opening in the exterior skin such that the desired area to be imaged can be captured. Furthermore, at the opening of the housing of the camera module, there may be provided a further flap, for example a protective flap with a seal, which is tilted open by the movement of the camera from the first position into the second position. The additional protective flap provides protection for the camera and the camera module if the handle is manually actuated and, for example, a hand of a user engages under the handle into the opening of the vehicle body.

Illustrative embodiments provide a vehicle which comprises a body and the above-described operating device. An opening is provided in an exterior skin of the body, and the operating handle of the operating device is mounted in the opening of the exterior skin. The camera module of the operating device is mounted in the interior region of the vehicle such that the opening of the housing and the opening of the exterior skin are situated opposite one another such that the camera, in the second position, projects at least partially outward through the opening of the housing and through the opening of the exterior skin. In a vehicle of the type, the camera can be deployed when required, for example during a parking maneuver or during reverse travel, and can be stored in a protected manner in the interior of the vehicle when it is not being used. By virtue of the camera being formed as part of the operating device, an unobtrusive mounting of the camera on the vehicle is possible.

The body of the vehicle may for example comprise a tailgate or a luggage compartment cover of the vehicle. In this case, the operating device may serve for opening a lock for the tailgate or the luggage compartment cover. The camera, in the first position, is accommodated in a protected manner within the tailgate or the luggage compartment cover, and the camera, in the second position, projects out of the operating device such that, when the tailgate is closed or luggage compartment cover is closed, an objective of the camera can image a rearward ground area behind the vehicle. Such operating devices with an integrated camera may also be used at other locations in the vehicle, for example in the region of the side doors of the vehicle, for example to image a lateral distance of the vehicle from a roadway margin or a roadway marking.

To make reverse driving easier for a driver of a vehicle, for example of a passenger motor vehicle or a heavy goods vehicle, for example during a parking maneuver, so-called reversing cameras are provided which are capable of imaging an external area to the rear of the vehicle and displaying the area for example on a display device and a dashboard of the vehicle. For example, a camera may be attached to a rear side of the vehicle so as to be capable of imaging an area behind the vehicle including at least a part of a rear bumper of the vehicle. To protect the camera, it may be provided that the camera is arranged in a retractable manner in an opening of the body. A particularly unobtrusive appearance is obtained if the camera is arranged in a retractable manner in a body opening in which there is additionally arranged an operating element, for example a handle, for opening a tailgate or a luggage compartment cover of the vehicle.

In this context, EP 2 054 572 B1 discloses a device for opening a vehicle lock and for image capturing in the area external to the vehicle. The device comprises a shell-shaped support, which is situated in an aperture of an outer paneling of the body, a handle, which is mounted in the support shell such that it can perform a tilting movement and which can be moved between two tilting positions, and a camera which serves for image capturing. The handle can be moved between a tilted-closed position, in which the unactuated handle closes off the shell opening of the support shell and leaves the lock unactuated, and a tilted-open position in which the actuated handle has been manually tilted out of the support shell and/or into the support shell and actuates the lock. The camera is seated on a rear wall of the support shell. The rear wall of the support shell has a hole behind which there is fastened the housing of a module housing in which a camera holder for the camera is both mounted so as to be pivotable and also guided for a translational movement for the camera to be pivoted between two positions, specifically firstly a retracted position and secondly a deployed position. On the module housing there are arranged both a drive and also a gearing for the rotational-translational movement of the camera holder. Owing in particular to the translational movement, however, a relatively powerful electric motor is required as a drive, which can make the device relatively expensive.

The invention claimed is:

1. A pivoting mechanism for the movable attachment of a camera to a vehicle, the pivoting mechanism comprising:
   a vehicle-side component which can be attached to the vehicle;
   a first rotary joint attached to the vehicle-side component;

a first pivot arm having a first end, a second end and a first length, wherein the first end is rotatably mounted on the first rotary joint at a fixed point on the first pivot arm;
a second rotary joint attached to the vehicle-side component at a first distance from the first rotary joint;
a second pivot arm having a first end, a second end and a second length, wherein the first end is rotatably mounted on the second rotary joint;
a camera holder which can be attached to the camera;
a third rotary joint attached to the camera holder and on which the second end of a first pivot arm is rotatably mounted; and
a fourth rotary joint attached to the camera holder at a second distance from the third rotary joint and on which the second end of a second pivot arm is rotatably mounted at a fixed point on the second pivot arm.

2. The pivoting mechanism of claim 1, wherein the first distance and the second distance are different and/or the first length and the second length are different.

3. The pivoting mechanism of claim 1, wherein the first distance, the second distance, the first length and the second length are dimensioned so that the camera holder is movable between a first position and a second position in relation to the vehicle-side component, and so that at least one region of the camera holder moves along an S-shaped movement path during a movement of the camera holder between the first position and the second position in relation to the vehicle-side component.

4. The pivoting mechanism of claim 3, further comprising a drive unit that moves the camera holder between the first and the second position.

5. A camera module for a vehicle, comprising:
the pivoting mechanism of claim 1; and
a camera attached to the camera holder of the pivoting mechanism.

6. The camera module of claim 5, wherein the vehicle-side component comprises a housing with an opening, wherein the first distance, the second distance, the first length and the second length of the pivoting mechanism are dimensioned such that the camera is movable between a first position and a second position in relation to the housing, wherein the camera, in the first position, is arranged in the interior of the housing, and wherein the camera, in the second position, projects at least partially outward through the opening of the housing.

7. An operating device for opening a vehicle lock, comprising:
an operating handle that can be mounted in an opening of an exterior skin of a vehicle body, wherein the operating handle can be moved from a rest position into an actuated position in order to open the vehicle lock, wherein the operating handle, in the rest position, substantially closes the opening in the exterior skin, and in the actuated position, projects at least partially from the exterior skin; and
the camera module of claim 6, which camera module can be mounted in an interior region of the vehicle within the exterior skin such that the opening of the housing and the opening in the exterior skin are situated opposite one another such that the camera, in the second position, projects at least partially outward through the opening of the housing and through the opening in the exterior skin.

8. The operating device of claim 7, wherein the operating handle is moved from the rest position into the actuated position with the movement of the camera from the first position into the second position.

9. A vehicle, comprising:
a body with an exterior skin in which an opening is provided; and
the operating device of claim 7, wherein the operating handle of the operating device is mounted in the opening of the exterior skin, and wherein the camera module of the operating device is mounted in the interior region of the vehicle such that the opening of the housing and the opening of the exterior skin are situated opposite one another such that the camera, in the second position, projects at least partially outward through the opening of the housing and through the opening of the exterior skin.

10. The vehicle of claim 9, wherein the body comprises a tailgate or a luggage compartment cover of the vehicle, wherein the operating device serves for the opening of a lock for the tailgate or the luggage compartment cover, wherein the camera module is mounted such that, when the tailgate or luggage compartment cover is closed, an objective of the camera, in the second position, is directed toward a rearward ground area behind the vehicle.

\* \* \* \* \*